(12) United States Patent
Schultz et al.

(10) Patent No.: US 7,480,447 B2
(45) Date of Patent: Jan. 20, 2009

(54) PAUSE TIME RECOVERY AND PLAYBACK SPEED-UP WITHOUT LOSS OF PICTURE INFORMATION

(75) Inventors: Mark Alan Schultz, Carmel, IN (US); Steven Anthony Barron, Carmel, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 840 days.

(21) Appl. No.: 10/811,165

(22) Filed: Mar. 26, 2004

(65) Prior Publication Data

US 2005/0213936 A1 Sep. 29, 2005

(51) Int. Cl.
*H04N 7/26* (2006.01)
(52) U.S. Cl. .............................. 386/111; 386/68; 386/81
(58) Field of Classification Search .................... 386/68, 386/81, 111
See application file for complete search history.

(56) References Cited

U.S. PATENT DOCUMENTS 6,553,177 B1 * 4/2003 Shimizu et al. ............... 386/68

2003/0081940 A1 * 5/2003 Lin et al. ...................... 386/68
2004/0057696 A1 3/2004 Peters et al.

FOREIGN PATENT DOCUMENTS

| DE | 3925046 | 1/1991 |
| EP | 0473322 | 3/1992 |
| WO | WO97/39577 | 10/1997 |
| WO | WO99/65239 | 12/1999 |

* cited by examiner

*Primary Examiner*—Thai Tran
*Assistant Examiner*—Girumsew Wendmagegn
(74) *Attorney, Agent, or Firm*—Joseph J. Laks; Robert B. Levy; Jorge Tony Villabon

(57) ABSTRACT

The invention concerns a method and digital recording device for faster than normal playback of a 24 fps presentation without any loss of program information. A 24 fps playback signal is produced from a storage medium. Subsequently, a pull-down process can be performed to reformat the 24 fps playback signal for a video display, for example at 30 fps. Finally, redundant field pictures produced by the pull-down process can be selectively dropped to increase a playback speed of the presentation. The method can further include the step of selectively controlling a number of the redundant field pictures that are dropped responsive to a user input. This step can be performed automatically by calculating the rate at which the redundant field pictures must be dropped responsive to a user input.

11 Claims, 2 Drawing Sheets

PAUSE TIME RECOVERY AND PLAYBACK SPEED-UP WITHOUT LOSS OF PICTURE INFORMATION

BACKGROUND OF THE INVENTION

1. Technical Field

These inventive arrangements relate generally to methods and apparatus providing advanced operating features for video only and both video and audio programs on a recordable medium, and in particular to recordable digital video discs, hard drives and magneto optical discs.

2. Description of the Related Art

Various devices have been developed to enable consumers to record video and/or audio programs for later presentation. Such devices include tape recorders, video cassette recorders, recordable compact discs, personal video recorders (PVR) using magnetic hard drives, and recordable digital video discs (DVD). Magneto optical discs can also be used for this purpose.

In certain instances, it may be desirable to allow a user to view a play back of a recorded video presentation at a slightly higher than normal speed. Consider, for example the case where a viewer may be interrupted while watching a program. Digital video recording devices such as a PVR or recordable DVD units, can incorporate a pause feature and a pause-resume feature. Thus the interrupted viewer wishing not to miss any of the presentation can initiate the pause feature, during which time incoming programming from a broadcast can be recorded. When the interrupted viewer returns the pause-resume feature is activated and the video recorder effectively jumps back to that portion of the program where the pause was initiated to commence playback. However, the digital video recording device continues to record incoming video programming. As a result, the interrupted viewer is able to watch a program in its entirety.

When the digital video recording device is in the pause-resume mode, there will be a delay, equal to the duration of the pause mode, between the real-time video received by the digital video recording device and the replay of that video to a display. For example, if a ten minute portion of a video broadcast is recorded when the device is in pause mode, then the replay or output displayed video will continuously lag ten minutes behind the real-time recording once the user returns and places the device in the pause-resume mode. In certain instances, it may be desirable to eliminate this delay. For example, a user may desire to complete the viewing of a recorded presentation on the hour or half-hour, so as to again view live broadcast video programming in real time. In such instances, it can be highly desirable for the video recording device to play back the video presentation at a slightly faster than normal rate in order for the replay material to effectively catch up with the live broadcast video programming.

Of course, there are many other reasons why a viewer may wish to view a presentation at a slightly faster than normal rate. While video recording devices have the capability to perform higher than normal speed playback, these systems generally suffer from several deficiencies. For example, the audio may be distorted or there may be visible loss of program content resulting from the speed-up process. These are undesirable side-effects for viewers who simply want view the video program at a slightly accelerated play speed, but without any significant or perceptible loss of original presentation material.

SUMMARY OF THE INVENTION

The invention concerns a method for faster than normal playback of a 24 fps presentation without any loss of picture information or theatric content. A 24 fps playback signal is produced from a storage medium such as film and subjected to a 3:2 pull-down process which reformats the 24 frames per second playback signal for a video display rate of, for example 30 frames per second. This reformatting process creates the additional pictures required to provide 30 fps, required by the TV system, by duplicating fields from certain of the 24 frames per second film images. Advantageously some of these redundant or duplicated field pictures produced by the 3:2 pull-down process can be selectively dropped to increase a playback speed of the presentation but without loss of program content. The method can further include the step of selectively controlling a number of the redundant field pictures that are dropped responsive to a user input. This step can be performed automatically by calculating the rate at which the redundant field pictures must be dropped responsive to a user input. For example, the user input can identify a desired time for completion of a recorded presentation. The system can selectively drop the redundant field pictures at the rate that has been automatically calculated.

The invention also concerns a digital video recorder operating in accordance with the above-described method for providing a faster than normal playback of a 24 fps presentation without any loss of picture information. The digital video recorder can include a digital video storage medium, and a suitable decoder (such as an MPEG decoder) for producing a 24 fps playback signal from a 24 fps presentation stored on the storage medium. The system can also preferably include a display engine or display processor for performing a pull-down process to reformat the 24 fps playback signal for a video display. The display processor can be responsive to a user input for selectively dropping redundant field pictures produced by the pull-down process to increase a playback speed of the presentation.

The display processor can be responsive to a user input for selectively controlling a number of the redundant field pictures that are dropped. According to one aspect of the invention, a control processor can automatically calculate the rate at which the redundant field pictures must be dropped responsive to a user input. The user input can be any information that is useful for helping the controlprocessor determine the degree to which the presentation speed must be increased. For example, the user input can directly or indirectly identify a desired time for completion of the presentation or a relative play-back speed. In any case, the display processor can selectively drop the redundant field pictures at the rate that has been automatically calculated.

DETAILED DESCRIPTION OF THE PREFERRED EMBODIMENTS

Personal Video Recorder System

Figure 1:
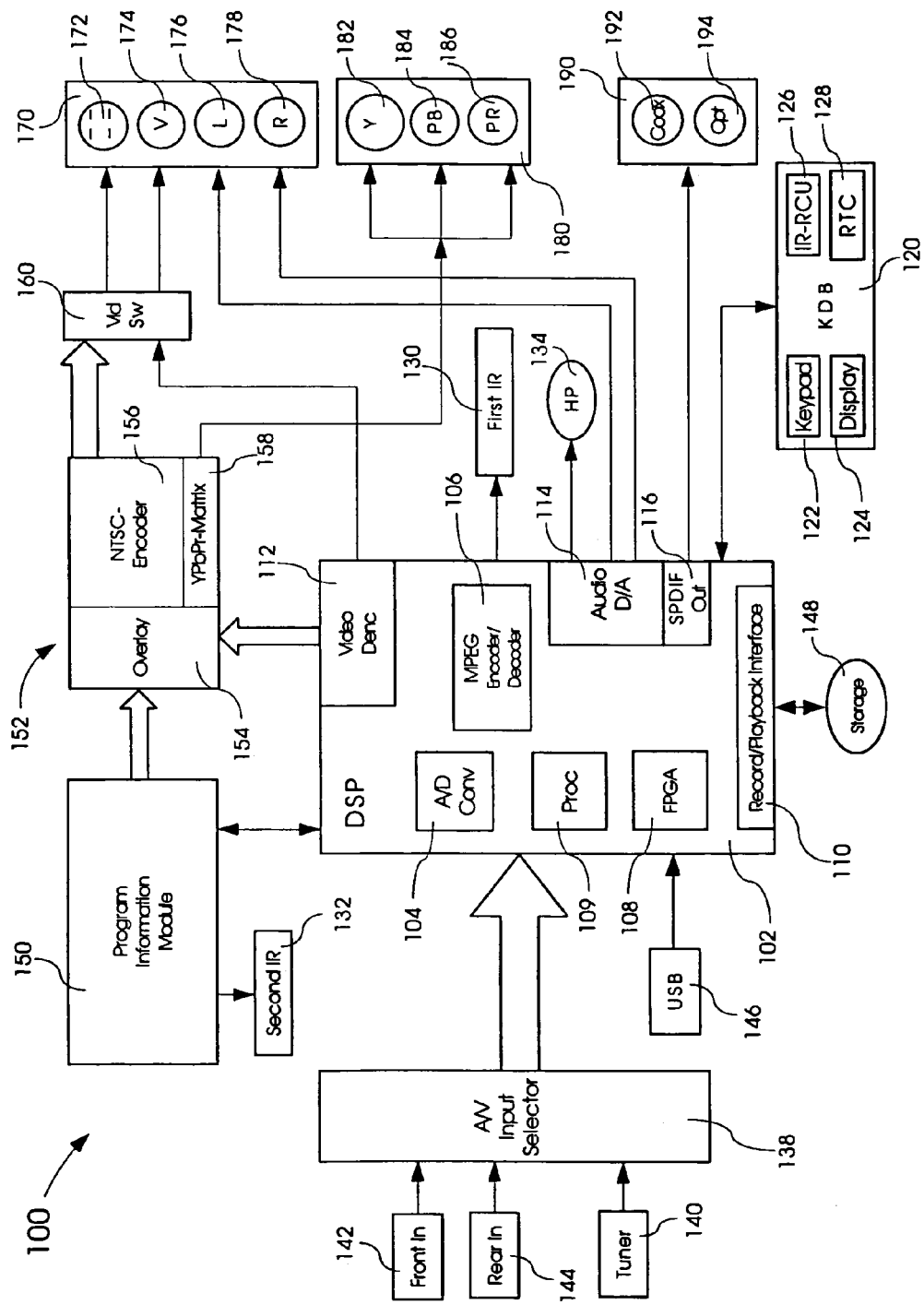
FIG. 1 is a simplified block diagram of a digital video recording device that is useful for understanding the invention.

As shown in FIG. 1, a personal video recorder 100 can include a digital signal processor (DSP) 102, a key and display board 120, a tuner 140, an A/V input selector 138, a USB input 146, a storage device 148 and a program information module 150. Additionally, the PVR 100 can include first and second infra-red (IR) links 130 and 132, a video overlay encoder 152, a video switch 160, a headphone jack 134, a standard A/V component connector block 170, a Y Pr Pb component connector block 180, and a Sony/Phillips digital interface (SPDIF) connector block 190.

The component connector blocks 170, 180 and 190 can provide audio/video signals in a variety of output formats. For example, the standard A/V component connector block 170 can comprise an S-video connector 172 for outputting to a video display video that has been separated into chrominance and luminance video signals and a composite video connector 174 for providing a standard composite video signal. Further, the standard A/V component connector block 170 can comprise left and right audio output connectors, 176 and 178, respectively.

The Y Pr Pb component connector block 180 is typically used for high definition television (HDTV). The Y Pr Pb component connector block 180 comprises a video luminance (Y) output connector 182 for providing an analog video luminance component, a Pb output connector 184 for providing an analog blue color difference (B−Y), and a Pr output connector 186 for providing an analog red color difference (R−Y). Lastly, the SPDIF component connector block 190 comprises a coaxial output 192 and an optical output 194 for outputting digital audio signals via a coaxial cable or fiber optic cable, respectively.

The key and display board 120 can be provided as a user interface for the PVR 100 and can incorporate a keypad 122, a display 124, an IR remote control interface 126 and a real time clock 128. By using the keypad 122 or the IR remote control interface 126, a user can select functions to be executed by the PVR 100. For example, a user can choose to change channels on the PVR 100 or to perform trick mode playback. The real time clock 128 can keep time, which can be shown by the display 124. The display 124 also can show other information as well, for example a trick mode being executed the PVR 100, a selected channel being recorded by the PVR 100, or an identifier for a presentation being shown on a video display.

First and second IR links 130 and 132 form a set of communication links between satellite and non-satellite applications to help simplify the interface between the audio, video, and data streams. The first IR link 130 can be a communication interface between the DSP 102 and other devices having an IR communication link. Notably, the first IR link 130 can be useful for controlling other devices designed specifically for aired or cable television broadcasts or radio broadcasts using standard program guide information. The first IR link 130 also can enable features to simplify the consumer's interaction between devices. For example, the first IR link 130 can enable one touch program recording, as well as other user conveniences. The second IR link 132 can provide an interface between the program information module 150 and other devices having IR communication links. Significantly, the second IR link 132 can be useful for communicating with devices not requiring a direct connection to DSP 102, for example with a cable reception device, a VCR, etc.

Digital signal processor 102 can comprise an analog to digital (A/D) converter 104, an MPEG encoder/decoder 106, a field programmable gate array (FPGA) 108, a micro controller 109, a recorder/playback interface 110, a digital video processor/encoder 112, an audio digital to analog converter (audio D/A) 114 and a SPDIF output 116. The DSP 102 can further include one or more data busses enabling the different DSP components to communicate with each other and cooperatively process data. Notably, interrupt requests (IRQs) and direct memory addresses (DMAs) can be utilized to facilitate buss communications and data processing.

Audio/Video (A/V) input selector 138 can include a plurality of A/V inputs. For example, the input selector 138 can incorporate an A/V input to receive A/V signals from tuner 140. The input selector also can receive signals form various other input devices as well. For example, a video camera can send A/V signals to the input selector 138 via front A/V input 142, and a VCR can send A/V signals via rear A/V input 144. Significantly, other A/V devices can be connected to the A/V input selector 138 as well.

The A/V input selector 138 can forward the received A/V signals to DSP 102. The DSP's A/D converter 104 can be used to convert A/V signals received in an analog format to a digital format. A/V signals already in digital format can bypass the analog to digital conversion, for example, digital signals received via a universal serial buss (USB) interface 146.

Field programmable gate array 108 can provide instructions which are acted upon by controller 109 for processing data received from the A/V input selector 138 or the USB interface 146, depending on the type of data received. For example, if A/V data is received in an uncompressed form, FPGA 108 and controller 109 can control processing of A/V data by MPEG encoder/decoder 106 for MPEG compression prior to being sent to the record/playback interface 110. However, if A/V data is received in an MPEG compressed format, FPGA 108 and controller 109 can controllably couple the A/V data to the receive/playback interface 110. In either case the FPGA 108 can provide read/write instructions which are implemented by controller 109 and control record/playback interface 110, for storing the A/V data on buffer storage device 148.

MPEG encoder/decoder 106 can perform MPEG compression and decompression on digital A/V signals. For example, MPEG encoder/decoder 106 can receive digital A/V signals from A/D converter 104 or USB interface 146, compress the digital A/V signals using an MPEG format, and forward the compressed digital A/V signals to the receive/playback interface 110. The receive/playback interface 110 then can store the compressed digital A/V signals to storage 148. In addition MPEG encoder/decoder 106 can identify input video signals containing 3:2 pull down artifacts indicative of conversion from 24 fps film original sources. Having identified TV image material format converted from film original, MPEG encoder 106 can identify the duplicate, and therefor redundant picture material which is then discarded prior to MPEG compression.

Storage 148 can include one or more data storage devices. For example, a data storage device can be a magnetic storage medium, such hard disk drive (HDD), an optical storage medium, such as a digital video disk (DVD), an electronic storage medium, such as random access memory (RAM), a magneto/optical storage medium, or any combination of storage devices.

During playback the receive/playback interface 110 can read A/V data from storage 148. The A/V data then can be forwarded to MPEG encoder/decoder 106 for decompression. After decompression the A/V data can be separated into video and audio signals. The audio signal can be forwarded to SPDIF 116 to be output digitally via coaxial output 192 or optical output 194. The audio signal also can be forwarded to audio D/A converter 114 for D/A conversion. After D/A conversion the audio signal can be output via headphone jack 134 and/or left and right audio outputs 176 and 178.

The decompressed digital video signal can be processed by the digital video processor encoder 112, which can construct the required display picture rate, for example nominally 30 fps, perform D/A conversion of the video signal as well as encode the video signal into a variety of formats. For example, the video signal can be transcoded to form an RGB component format, separated into luminance and chrominance (Y+C) signals, or encoded into a composite NTSC video signal. The composite video and the Y+C video signals can be forwarded to video switch 160, while the RGB video signals can be forwarded to the video overlay encoder 152.

The video overlay encoder 152 can comprise overlay module 154, NTSC video encoder 156, and Y Pr Pb matrix encoder 158. The overlay module 154 can receive program information from a program information module 150 and graphically overlay the program information onto the video signal. The program information module 150 can extract the program information from an on-line program guide or a program guide contained in incoming A/V signals received by the A/V input selector 138 and communicated to the program information module 150 by the DSP 102. The program information can include available programs for each channel as well as program scheduling.

Further, for each individual program the program information can include a program identifier, channel information, recording time, program duration, scene data, program credits, etc. Other information and graphics may be overlaid, superimposed or inserted into the video signal as well. For example, a clock, text blocks, user information, menus, icons, pictures, etc. can be overlaid or combined with the video signal. Typically, information is overlaid onto the video signal when requested by a user or upon some pre-defined event. However, some information, such as a channel identifier, can be continually overlaid over the video signal.

The NTSC encoder can output the video signal as an NTSC formatted composite video signal, as well as video separated into separate luminance and chrominance signals. The video signals then can be forwarded the video switch 160. The video switch 160 can be used to select for display either the NTSC encoded video signal or the video signal generated by the video digital encoder 112. Composite video signals from either source can be output via composite video output connector 174, while chrominance and luminance video signals from either source can be output via the S-video output connector 172.

The Y Pr Pb matrix encoder 158 can generate a Y Pr Pb formatted analog video signal. As previously noted, the Y Pr Pb component video signals includes an analog video luminance (Y) signal, an analog red color difference (R−Y) and an analog blue color difference signal (B−Y). The luminance or Y component can be output to the Y output connector 182, the (B−Y) difference can be output to the Pb output connector 184 and the (R−Y) difference can be output to the Pr output connector 186.

The 3:2 Pull-Down Process

A wide variety of television broadcast programming originates from a film format. For example, many prime time programs, commercial advertisements and most feature movies are produced on film. However, film is conventionally produced for projection at a 24 frames-per-second (fps) rate, whereas the NTSC television standard specifies a picture rate of 30 fps. Accordingly, before a work produced on film can be used in a television system operating in accordance with the NTSC television standard, the picture or frame rate must be increased from 24 fps to nominally 30 fps. The foregoing process of converting from 24 fps to 30 fps is usually performed during telecine conversion in a process known as 3:2 pull-down. The telecine device converts film to video by mapping the 24 film frames occurring in a second to 60 video fields (30 frames each comprising two fields). The process maps four film frames to every 10 video fields (five video frames). This results in some film frames that are mapped to three TV fields with other film frames mapped to two TV fields.

Figure 2:
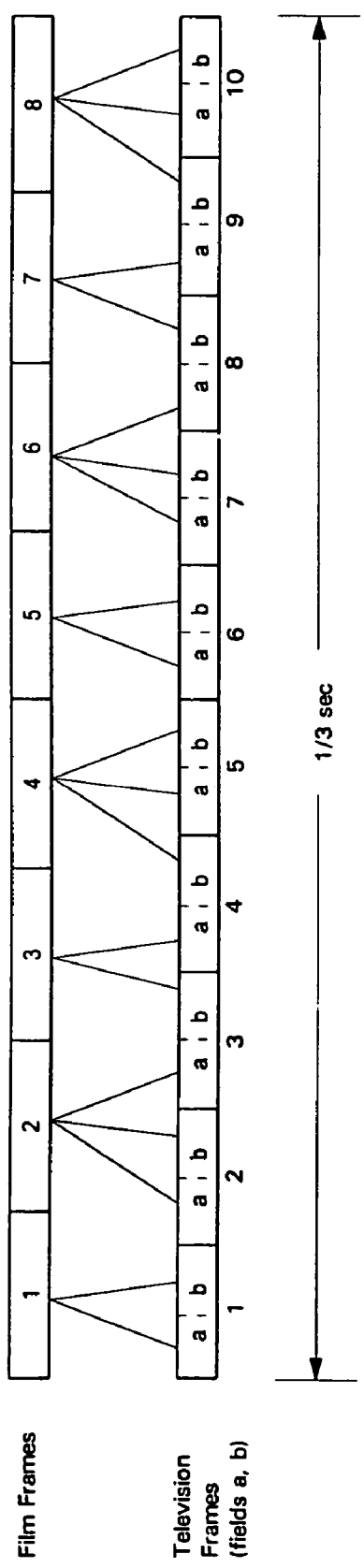
FIG. 2 is diagram that is useful for understanding the 3:2 pull-down process.

FIG. 2 is diagram that is useful for understanding the 3:2 pull-down process. As shown therein, film frames 1 through 8 represent ⅓ seconds of film. Each film frame is scanned to produce at least two fields of an associated television frame. In order to compensate for the format or display rate difference (i.e. 24 fps versus 30 fps), every other film frame is used to produce an extra field. For example, film frame 1 is used to produce video frame 1a and 1b, but film frame 2 is used to produce video frames 2a, 2b and 3a. This process is repeated as shown in FIG. 2 so as to correct for the difference in picture display rate.

MPEG encoder/decoder 106 can be designed to recognize when 3:2 pull-down processing has been performed on a received video signal. Such encoders are often configured to remove the extra or duplicate pictures (individual TV fields) inserted as a result of 3:2 pull-down process and then record the presentation in storage 148 with a 24 fps format. This is advantageous as it permits substantially fewer pictures to be stored on the storage medium 148 and lowers the bit rate, without any loss of picture or program information. Further, when film format material is broadcast digitally, it is often broadcast at a 24 fps rate and can be directly recorded in that format. Once again, this provides the advantage of requiring less space on the recording medium 148 and lowers the bit rate.

The invention shall now be described in reference to FIGS. 1 and 2. It should be understood that the organization and arrangement of the various components in FIG. 1 are not intended to limit the scope of the invention, but are instead intended as one exemplary arrangement. Further, it will be appreciated that one or more of the component blocks in FIG. 1 could be combined in a single video processor unit. For example, MPEG encoders and or decoders or codecs can often include a display processor which can construct display images and for example perform the picture rate conversion described herein.

A presentation stored on the storage medium 148 in 24 fps MPEG format can be decoded by MPEG encoder/decoder 106 to produce pictures similar to film frames 1 through 8 illustrated in FIG. 2. The film frames are passed to the video digital encoder 112 where they are processed for display in a video format, for example requiring 30 fps. In conventional systems, when video programming in 24 fps format is to be displayed, the digital video processor encoder 112 performs the 3:2 pull-down process to map the 24 film frames per second to 60 video fields (30 fps with two fields per frame). The 30 fps video output can be temporarily stored in a frame buffer before being passed to a video switch 160 for output through video output connector 174 in A/V component connector block 170. Alternatively the use of an output frame buffer can be avoided if the digital video processor encoder 112 makes repeat requests for the duplicate or redundant pictures required to increase the picture display rate.

The 3:2 pull-down process is preferably performed as shown in FIG. 1. In digital processor encoder 112 utilizing conventional 3:2 pull-down processes, field "a" will be repeated a second time following field "b" as shown. It should be understood that while the present invention is described in terms of a 3:2 pull-down process, it is not intended to be so limited. Instead, the invention could be also be implemented in the case of any other pull-down pattern or ratio as may be required.

According to one embodiment of the invention, the playback speed of the video presentation can be increased without any loss of original picture information if the video presentation at 24 fps were simply displayed instead at 30 fps. This can be accomplished by selectively controlling the display engine or processor so that none of the redundant "a" field pictures are added to the video output signal. However, such a change in display speed might prove to be too drastic since the difference in frame rates would be about 25%. This can be undesirable in some instances and hence finer control is required in order to increase the playback speed slightly and without any loss of original picture information. Accordingly, selectively dropping some, but not all, of the redundant field pictures, can produce a less noticeable speed-up effect. This system can substantially maintain lip-sync for normal audio and provide a catch-up mode where temporal or motion artifacts are invisible to the viewer.

The precise number of redundant field pictures that are dropped can be determined automatically. For example, a user could use key and display board 120 to select a desired time for completion of a presentation. Based on that information, and the amount of time remaining for playback of a recorded presentation, the video digital encoder 112 could determine the optimal rate at which redundant field pictures would need to be dropped in order for playback of the presentation to be completed by the user selected time. Other user criterion input by means of the key and display board 120 could also be used for automatically calculating the number of redundant pictures to be dropped. For example a user could indicate a relative playback speed, or other relevant time information to indirectly affect the rate of dropped pictures, and such other criterion are intended to be within the scope of the invention.

Alternatively, the system 100 can be directly responsive to a user input for increasing or decreasing the number of redundant field pictures that are dropped. Thus, in FIG. 1, a user input can be entered by means of key and display board 120 for selectively increasing or decreasing the number of redundant field pictures that are dropped by the video digital encoder. These inputs can be communicated from the key and display board 120 to the video digital encoder 112 for controlling the operation of the video digital encoder 112. A suitable system bus internal and/or external to DSP 102 can be provided to facilitate the communications among the various system components as shown.

MPEG video is conventionally comprised of I, B and P pictures. For example, a typical second of MPEG video at nominally 30 frames/second would be:

I B B P B B P B B P B B P B B I B B P B B P B B P B B P B B

Each picture in this case would be a frame picture, meaning that it contains both an "a" and a "b" field. In general, there are three phases of 3:2 pull-down based on an MPEG signal, depending upon whether the 3:2 pull-down will be repeating an extra field from an I, B or P type pictures. The three phases are illustrated in below in Table 1:

TABLE 1

|        | I | B | B | P | B | B...I | B | B |
|--------|---|---|---|---|---|-------|---|---|
| Case 1 | 3 | 2 | 2 | 3 | 2 | 2...3 | 2 | 2 |
| Case 2 | 2 | 3 | 2 | 2 | 3 | 2...2 | 3 | 2 |
| Case 3 | 2 | 2 | 3 | 2 | 2 | 3...2 | 2 | 3 |

Table 1 shows the number of fields that will be generated from each picture type. As previously described relative to FIG. 2, the 3:2 pull-down processing will result in some pictures generating 2 fields (neither field is repeated), and some pictures generating 3 fields (one of the fields is repeated and is therefore redundant). In those instances where there are 3 fields, there is at least one redundant field that is generated. Accordingly, those fields can be selectively dropped (not displayed) without any loss of picture information.

The rate at which the redundant fields are dropped will determine how much faster the presentation will be displayed as compared to the normal playback speed. Dropping all of the redundant fields as described above will produce the maximum increase in playback speed. However, in order to increase the playback speed in a way that is less noticeable to a viewer, less than all of the redundant fields can be dropped. For example, a redundant field could be dropped every n occurrences so as to control the playback speed, where n is an integer. The result can be a speeding up of the playback in a manner that can be nearly unnoticeable to the viewer, and without any loss of picture content. The audio in this system should also be able to maintain lip-sync with the picture content, a feature that is not typical for conventional trick modes.

What is claimed is:

1. In a video recording device, a method for playback at a speed faster than normal playback speed for programming originating from film without loss of program information, comprising the steps of:
    identifying during playback repeated image information indicative of film original material; and,
    selectively dropping ones of said identified repeated image information to increase a playback speed of said programming originating from film,
    wherein a number of the selectively dropped ones of said identified repeated image information is determined directly responsive to a user input specifying non-speed time information or an integer representing which occurrence of a same repeated image information is to be dropped.

2. The method according to claim 1, further comprising the step of automatically calculating a rate at which said repeated image information must be dropped responsive to the user input specifying the non-speed time information.

3. The method according to claim 1, wherein said user input specifying the non-speed time information identifies a desired time for completion of playback of a recorded presentation.

4. The method according to claim 2, further comprising the step of selectively dropping said repeated image information at said rate that has been automatically calculated.

5. The method according to claim 1, wherein said repeated image information comprises redundant field pictures.

6. A digital video recorder facilitating playback of programming originating from film at a speed greater than normal playback speed, comprising:
    a digital video storage medium containing a record having programming originating from film;

a decoder for decoding said record to form an uncompressed picture signal; and, a display processor receiving and formatting said uncompressed picture signal for a television display rate, controlling said formatting to selectively drop redundant field pictures and increase said playback speed of said programming originating from film, wherein a number of said redundant field pictures that are dropped is determined directly responsive to a user input specifying non-speed time information or an integer representing which occurrence of a same redundant field is to be dropped.

7. The digital video recorder according to claim 6, wherein said display processor formats said uncompressed picture signal for television display by controllably duplicating pictures within said uncompressed picture signal to produce a television picture display rate.

8. The digital video recorder according to claim 6, wherein a controller is responsive to the user input for selectively controlling the number of said redundant field pictures that are dropped by said display processor.

9. The digital video recorder according to claim 6, wherein a controller automatically calculates the rate at which said redundant field pictures must be dropped responsive to the user input specifying the non-speed time information.

10. The digital video recorder according to claim 9, wherein said user input specifying the non-speed time information identifies a desired time for completion of said presentation.

11. The digital video recorder according to claim 9, wherein said display processor selectively drops said redundant field pictures at said rate that has been automatically calculated.

* * * * *